United States Patent [19]

Denninger

[11] 4,109,406
[45] Aug. 29, 1978

[54] PYROTECHNICAL MOLE TRAP

[75] Inventor: Claude Denninger, Chazay D'Azergues, France

[73] Assignees: Sogemaric, Société de Gestion et de Marketing pour Industries de Consommation, Paris; Societe E. Lacroix, Muret, both of France

[21] Appl. No.: 776,272

[22] Filed: Mar. 10, 1977

[30] Foreign Application Priority Data

Mar. 30, 1976 [FR] France .............................. 76 09764
Jan. 10, 1977 [FR] France .............................. 77 00951

[51] Int. Cl.² .......................................... A01M 27/00
[52] U.S. Cl. .................................................. 43/84
[58] Field of Search .............................. 43/84; 102/8

[56] References Cited

U.S. PATENT DOCUMENTS

| 725,883 | 4/1903 | Sims | 43/84 |
| 1,410,406 | 3/1922 | Jolliff et al. | 43/84 |
| 2,809,464 | 10/1957 | Sutton | 43/84 |

OTHER PUBLICATIONS

McBride, "The Colonel Got His Gopher", The Explosive Engineer, May–Jun., 1947; p. 86.

Primary Examiner—Clifford D. Crowder
Attorney, Agent, or Firm—Browdy and Neimark

[57] ABSTRACT

A pyrotechnical mole trap includes:

an elongate protective envelope which is open at its ends and which is intended to be placed in the mole run, an electrical contactor placed inside the protective envelope, two displaceable triggers mechanically controlling the electrical contactor, each of these triggers being placed at one of the ends of the protective envelope, two electrically fired deflagrating pyrotechnical charges, of which each is placed on the outside of the protective envelope near each of the triggers, a source of electric energy, an electrical circuit which connects together the electrical contactor, the pyrotechnical charges and the source of electrical energy and which is wired in such a way that the action of the mole on either of the triggers closes the electrical circuit and fires the pyrotechnical charge situated in the immediate proximity of that trigger.

11 Claims, 6 Drawing Figures

PYROTECHNICAL MOLE TRAP

This invention relates to a new pyrotechnical trap enabling moles and other similar harmful animals to be readily destroyed.

The mole (Talpa europea), a very widespread insectivore, causes considerable damage in gardens, orchards, meadows and land under general cultivation on account of the numerous runs which it burrows in the ground. These runs disturb the root system of crops and open at the surface of the soil in the form of hillocks which are harmful to crops. In the case of meadows, the presence of the hillocks is also extremely troublesome because it makes the grass difficult to cut by machine.

Various means have already been proposed for destroying moles such as, for example, poisoned bait and poison gases, but none of them has proved to be entirely satisfactory and, in addition, involves serious risks for the user.

In addition, various types of mechanical anti-mole traps have also been proposed. On account of the fact that they are generally fairly bulky, these mechanical traps are generally difficult to position and their effectiveness is fairly mediocre.

It has also been proposed to destroy moles by means of anti-mole pistols which are positioned in the mole run. This particular type of trap is the subject of U.S. Pat. No. 3,140,556. These anti-mole pistols generally comprise mechanical means actuated by the mole itself which cause the striking of a cartridge and the firing of projectiles in a well defined direction. These anti-mole pistols are dangerous to handle for the user. Moreover, they are only effective if the mole is situated in the trajectory of the projectiles at the moment of firing. Thus, a mole seeking to evade the trap can set it off by means of the soil which it displaces whilst remaining outside the trajectory of the projectile. Finally, this type of trap has the disadvantage of mutilating the mole, thus preventing any subsequent use of the skin of the mole, for example in skin dressing.

Finally, it has already been proposed to destroy moles in their run by the explosion of a detonating pyrotechnical change using the device described in U.S. Pat. No. 2,809,464. This device comprises a plate actuating an electrical contactor which itself is connected to a detonating charge through an electrical circuit comprising a source of electrical energy. This detonating charge is fired by the passage of current through the detonator. When the trap is positioned in the mole run, the action of the mole on the plate causes the detonating pyrotechnical charge to explode by way of the contactor and the electrical circuit. The main disadvantage of this trap is that it uses as its pyrotechnical charge a detonating charge of which the explosion is very dangerous to the user and to domestic animals and which result in mutilation of the mole. Another serious disadvantage of this trap is that it can only operate if the mole, moving along its run, comes into contact with the trap on that side of the trap where the plate is situated, because a mole coming into contact with the trap on that side opposite the side where the plate is situated will not suffer any injury, resulting in a significant percentage of failures in the use of this trap. Finally, the trap described in this U.S. Pat. No. 2,809,464 would appear to be difficult to use in practice on account of its lack of tightness on the one hand with respect to moisture, which can interfere with the operation of the electrical system, and on the other hand with respect to the soil of which the movement can interfere with the operation of the moving elements when the trap is positioned in the mole run.

The present invention enables these disadvantages to be obviated. The present invention relates to a new pyrotechnical trap having the following advantages:

- it does not involve any danger for the user and for the domestic animals
- its effectiveness on the mole is extremely high, often of the order of 100%,
- it kills instantaneously the moles without mutilation, burning or any significant external lesion, which enables the mole skins to be subsequently used, for example in skin dressing,
- it is moisture-proof and its operation cannot be disturbed by the soil displaced by the mole.

The work carried out by Applicants has shown that the mole is a relatively delicate animal which does not stand up very well to shocks and that it is possible to kill it easily by the shock wave created by the explosion of a deflagrating pyrotechnical charge of very low power.

It is therefore possible to destroy moles by the explosion of weak deflagrating pyrotechnical charges which are harmless to the user and to domestic animals, in contrast to detonating pyrotechnical charges which may involve a certain risk to the user.

The invention relates to a pyrotechnical trap, distinguished by the fact it essentially comprises:

- a protective envelope of elongate form which is open at its ends, is preferably tubular shape and is intended to be placed in the mole run,
- an electrical contactor placed inside the protective envelope,
- two displaceable triggers mechanically controlling the electrical contactor, each of these triggers being placed at one of the ends of the protective envelope,
- two electrically fired deflagrating pyrotechnical charges of which each is placed on the outside of the protective envelope near each of the triggers,
- a source of electrical energy,
- an electrical circuit which connects together the electrical contactor, the pyrotechnical charges and the source of electrical energy and which is wired in such a way that the action of the mole on either of the triggers results in the closure of the electrical circuit and in the firing of the pyrotechnical charge situated in the immediate proximity of that trigger.

With an arrangement such as this, it can be seen that the firing of the pyrotechnical charge by the mole itself is capable of causing, in the immediate vicinity of the animal, an explosion which will be mortal although of relatively low power. The use of electrical energy as transmission means between a contactor device actuated by the mole itself and the pyrotechnical charge or charges makes it possible to obtain a simple trap which is extremely safe to use and, at the same time, highly sensitive in operation.

The invention will be better understood from the following description in conjunction with the accompanying drawings given solely by way of example, wherein.

Figure 2:
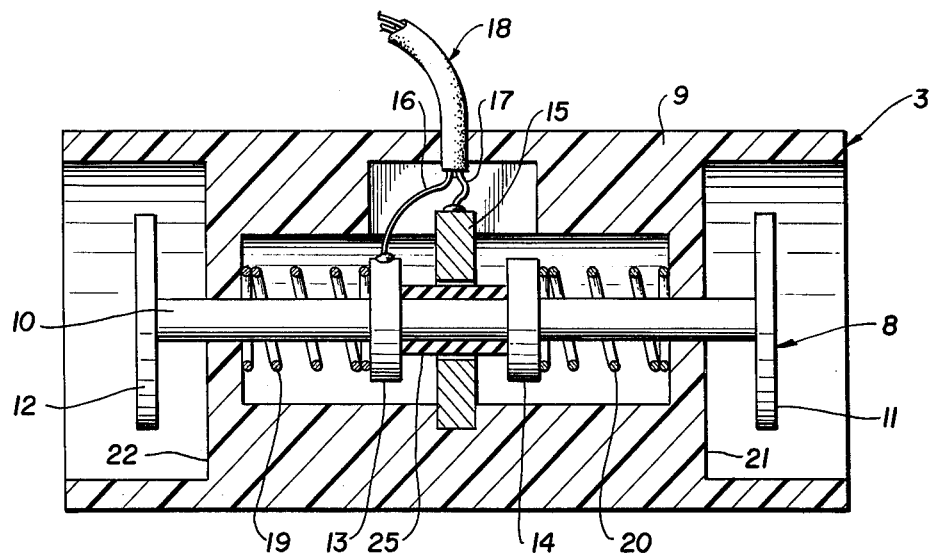
FIG. 2 is a longitudinal section through the contactor device used in the pyrotechnical trap illustrated in FIG. 1.
Figure 3:
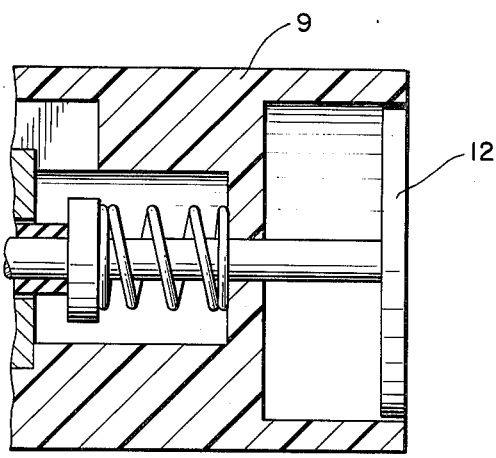

Finally, FIGS. 3, 4, 5 and 6 illustrate improvements in the device shown in FIG. 2.

Figure 1:
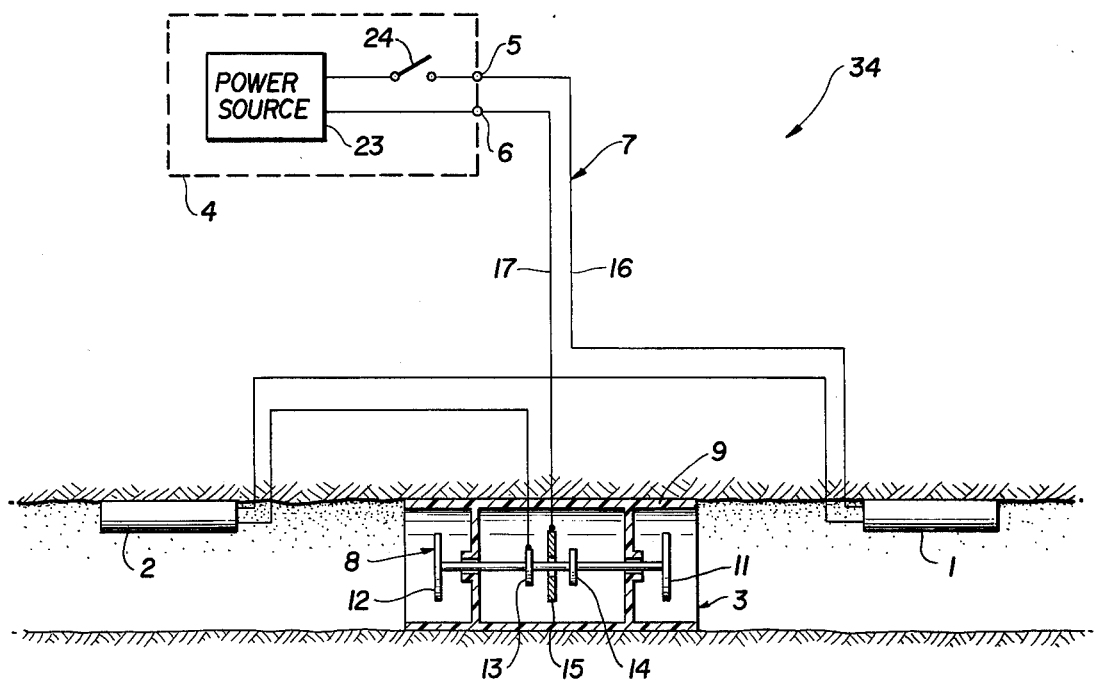
FIG. 1 is a diagrammatic view of the pyrotechnical mole trap according to the invention.

In FIG. 1, the reference 34 globally denotes the pyrotechnical trap which is essentially intended for the destruction of harmful animals, such as moles.

That part of the trap 34 to be buried in the ground essentially comprises two electrically fired pyrotechnical charges 1 and 2 and a mechanically controlled contactor device 3, whilst that part of the trap 34 situated above the ground essentially comprises an electrical control box 4 of which the output terminals 5 and 6 have to be suitably connected by an appropriate electrical installation 7 on the one hand to the pyrotechnical charges 1 and 2 and on the other hand to the contactor 3.

The electrical installation 7 consists in connecting the fixed contact element 15 by the conductor 17 to the terminal 6 of the electrical control box 4 and connecting the electrically fired pyrotechnical charges 1 and 2 in series between the terminal 5 of this box and the conductor 16 connected to the mobile contact elements 13 and 14.

The optional control box 4 consists of a source of electricity, such as a dry cell 23, and of a safety switch 24 intended to bring the cell 23 into operation once the installation 7 has been correctly positioned.

The mole trap operates as follows:

Once the contactor device 3 and the pyrotechnical charges 1 and 2 have been positioned in the run and once the connections of the installation 7 have been made, the operator closes the safety switch 24, thus bringing the power source 23 into operation. The mole or harmful animals, moving along the trapped run, will bear either directly or indirectly on one of the triggers in the form of discs 11 and 12 of the contactor device 3. In the case of the mole, it is not uncommon for it to move along by pushing a plug of soil in front of it, which explains the spaced arrangement of the charges 1 and 2 relative to the contactor 3. Under the action of this pressure, the contact assembly 8 moves in one direction or the other from its normal position, so that one of the mobile elements 13 and 14 comes into contact with the fixed contact element 15.

The electrical connection thus established between the conductor elements 15 and 17 closes the electrical circuit for firing the pyrotechnical charges 1 and 2. With a suitable arrangement of these charges, at least one of them explodes in the immediate vicinity of the harmful animal and destroys it.

The contactor device 3, in the particular embodiment illustrated in FIG. 2, comprises a central control assembly 8 mounted slide in a generally tubular protective envelope 9 which is made of an insulating material, such as a rigid plastics material. The assembly 8 consists of a central shaft 10, of which the median part is made of a good conductor of electricity, two triggers in the form of discs 11 and 12 situated at the two ends of the shaft 10, two annular contact elements 13 and 14 suitably arranged in the median part of the shaft 10 and spaced a certain distance apart from one another with an insulating spacer 25 in between.

In the normal position of the assembly illustrated in FIG. 2, the annular contact elements 13 and 14 are situated on either side of a fixed annular contact element 15 held in position in the protective envelope 9 by any suitable means. Two flexible conductors 16 and 17 are respectively connected to the mobile contact formed by the elements 13 and 14 and to the fixed contact formed by the element 15. A flexible sleeve 18 provides for the fluid-tight passage of the conductors 16 and 17 through the protective envelope 9.

With an arrangement such as this, it will be appreciated that the displacement of the assembly 8 on either side of the normal position illustrated in FIG. 2 brings one of the contact elements 13 or 14 into contact with the fixed contact element 15. Two light helical springs 19 and 20 with similar characteristics are interposed between each of these elements 13 and 14 of the assembly 8 and one of the two bearing surfaces 21 and 22 formed in the protective envelope 9 for the axial displacement of the shaft 10. The opposing actions of the springs 19 and 20 enable the shaft 10 to be kept in the position illustrated.

The use of an electrical circuit 7, as illustrated in FIG. 1, between the contactor device 3 and the charges 1 and 2 for controlling the firing of the charges has numerous advantages, including above all the very considerable ease of installation and high degree of safety in the use of the trap by virtue of the fact that the trap is only effected from the moment when the safety switch 24 is closed.

The length and flexibility of the electrical conductors which form the circuit 7 enables the control box 4 to be sited in any required place, preferably remote from the place where the buried part of the trap has been installed. The contactor device 3 is with advantage provided with a very high level of sensitivity, the return force of the springs 19 and 20 being strictly limited to the force required to keep the assembly 8 likely in its normal position.

In the arrangement illustrated in FIG. 2, the contactor device 3 is capable of operating by "reciprocation", the mobile assembly 8 being able to move on either side of its normal position.

As already mentioned, the power source may be formed by a dry cell 23. Nevertheless, it will be understood that this source could also be formed by any other suitable known source of electricity, in particular the mains voltage.

It will also be understood that the trap 25 described above may be used for destroying certain harmful animals other than the mole substantially similar in size to the mole.

Each of the pyrotechnical charges 1 and 2 used is formed on the one hand by a deflagrating pyrotechnical composition and on the other hand by an igniter ignited by Joule effect which fires the pyrotechnical composition. The pyrotechnical composition used is preferably a composition containing from 0.1 to 1 g of black powder. The igniter which fires the pyrotechnical composition has the following characteristics:

its ohmic resistance is in the range from 0.1 ohm to 3 ohms,
  the initial intensity is in the range from 0.1 to 2 amps.

Each of the pyrotechnical charges is preferably accommodated in a case made either of a lightweight alloy based on aluminium or of a polymeric material. In one preferred embodiment, each of the pyrotechnical charges is removably attached to the elongate protective envelope on the outside and in the extension thereof in the vicinity of trigger. The fact that these pyrotechnical charges are removably secured to the protective envelope enables the used charges to be readily replaced.

In one particular embodiment, the pyrotechnical charges 1 and 2 are associated with the contactor device 3 by providing two axial extensions (not shown in FIG. 2) on the protective envelope 9 and by removably fixing the pyrotechnical charges 1 and 2 to the ends of these extensions.

It will be appreciated that the use of low-power deflagrating charges, except for detonating charges, as the pyrotechnical charges provides for high safety in use so that the trap does not involve any real risk either to man or to domestic animals larger in size than the mole.

The firing of the pyrotechnical charges may be observed from the outside by any suitable known means, for example by a small control pyrotechnical charge connected in series into the circuit 7.

FIGS. 3, 4, 5 and 6 illustrate improvements made to the device shown in FIG. 2. In the device shown in FIG. 2, each of the triggers 11 and 12 is in the form of a flat disc very much smaller in diameter than the internal diameter of the tubular protective envelope 9. According to FIG. 3, which is a section through the right-hand half of the contactor system, the trigger 12 in the form of a flat disc is placed inside the tubular envelope 9 at the end thereof, and the diameter of the disc 12 is slightly smaller than the internal diameter of the tubular envelope 9. This arrangement is particularly advantageous because it prevents the trigger 12 from being blocked by the soil displaced by the mole in its run.

Figure 4:
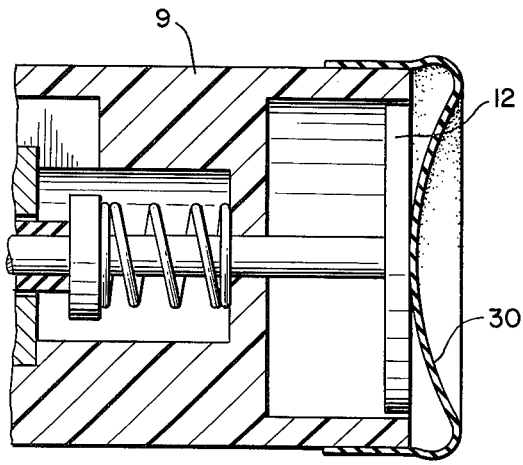
Figure 5:
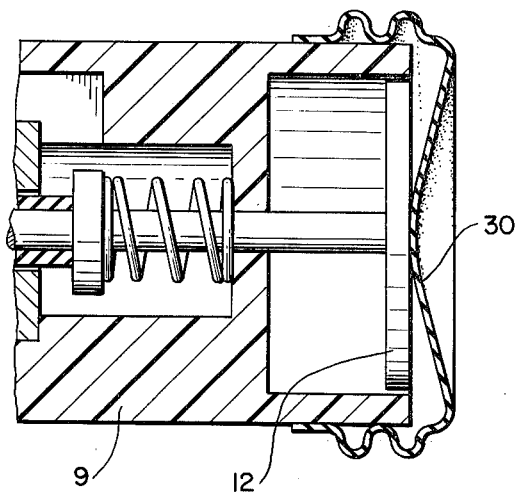
Figure 6:
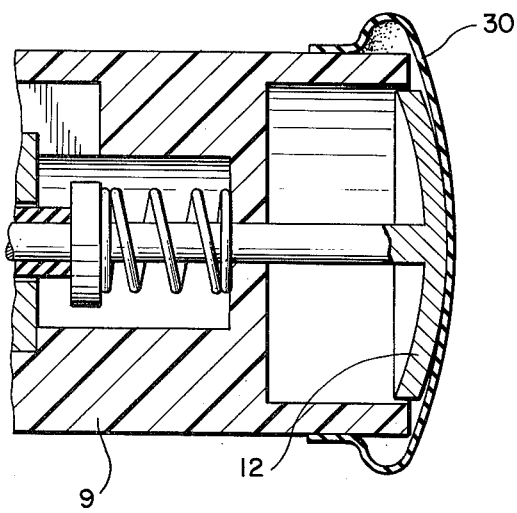

FIGS. 4, 5 and 6, each of which are sections through the right-hand half of a trap according to the invention, illustrate another improvement in the triggers illustrated in FIG. 2, according to which each of the triggers is protected by a flexible fluid-tight membrane 30 which is fixed to the outer part of the tubular protective envelope 9 at the end thereof and which comes into contact with each of the triggers 12 in the central part of its outer surface. The membrane 30 may be made of any material which is both elastic and moisture proof, for example natural or synthetic rubber.

The use of protective membranes such as these is particularly advantageous because it completely eliminates any risk of accidental blockage of the triggering system by the soil displaced by the mole in its run and any risk of degradation of the electrical contactor system by the moisture present in the mole run.

Another advantage of this particular arrangement is that it enables the trap to be set off when the acting forces show a certain inclination relative to the axis of the protective envelope, which is often the case when the mole laterally displaces soil by attempting to evade the obstacle formed by the trap.

The device according to the present application enables moles to be destroyed with effectiveness of substantially 100%, in contrast to the various types of already known traps of which the effectiveness is often very poor which are generally regarded by users as unsatisfactory, and dangerous to the user and to domestic animals.

Finally, it should be noted that, by means of the device according to the invention, the mole is killed instantaneously by the shock wave generated by the firing of the deflagrating pyrotechnical charge. Accordingly, it does not suffer any burning, any external lesion or mutilation, which enables the skin of the mole to be subsequently used, for example in skin dressing.

It is obvious that the invention is not limited to the embodiments which have been described and that numerous modifications may be made without departing from the scope of the invention.

I claim:
1. A pyrotechnical mole trap of which at least part is intended to be positioned in a mole run, comprising:
   an elongate protective envelope which is open at its ends and which is intended to be placed inside the mole run,
   an electrical contactor placed inside the protective envelope,
   two displaceable triggers mechanically controlling the electrical contactor, each of these triggers being placed at one of the ends of the protective envelope,
   two electrically fired deflagrating pyrotechnical charges of which each is placed on the outside of the protective envelope near each of the triggers,
   a source of electrical energy,
   an electrical circuit which connects together the electrical contactor, the pyrotechnical charges and the source of electrical energy and which is wired in such a way that the action of the mole on either of the triggers closes the electrical circuit and fires the pyrotechnical charge situated in the immediate proximity of that trigger.

2. A mole trap as claimed in claim 1, wherein the elongate protective envelope is a tubular envelope with a diameter similar to that of a mole run.

3. A mole trap as claimed in claim 1, wherein the contactor comprises at the centre of the protective envelope an axially displaceable contact assembly which, through its displacement, is capable of controlling the closure of the contacts of said contactor.

4. A mole trap as claimed in claim 3, wherein elastic means are provided for opposing the displacement of the displaceable contact assembly in the direction corresponding to the closure of the contacts.

5. A mole trap as claimed in claim 4, wherein the contact assembly is displaceable on either side of a normal position and comprises two electrically connected contacts situated on either side of a fixed contact.

6. A mole trap as claimed in claim 1, wherein each deflagrating pyrotechnical charge is formed by a deflagrating pyrotechnical composition and an electrically fired igniter.

7. A mole trap as claimed in claim 6, wherein the deflagrating pyrotechnical charge is formed by black powder in a quantity of from 0.1 to 1 gram per composition.

8. A mole trap as claimed in claim 6, wherein said igniter has the following electrical characteristics:
   an ohmic resistance in the range from 0.1 to 3 ohms,
   an initial intensity in the range from 0.1 to 2 amperes.

9. A mole trap as claimed in claim 6, wherein each pyrotechnical charge is placed in a case formed of a material selected from the group consisting of lightweight metal alloys and polymeric materials.

10. A pyrotechnical trap in accordance with claim 9, wherein each of said triggers is protected by a fluid-tight elastic membrane fixed to the outer part of the protective envelope at the end thereof and coming into contact with the central zone of the outer surface of said trigger.

11. A pyrotechnical trap as claimed in claim 1, wherein each of said triggers is protected by a fluid-tight elastic membrane fixed to the outer part of the protective envelope at the end thereof and coming into contact with said trigger in the central zone of the outer surface of that trigger.

* * * * *